(12) United States Patent
McGhghy

(10) Patent No.: US 6,543,176 B1
(45) Date of Patent: Apr. 8, 2003

(54) DECOY ANCHOR SYSTEM AND METHOD OF USE

(76) Inventor: Hugh McGhghy, 850 Circle Dr., Warsaw, MO (US) 65355

( * ) Notice: Subject to any disclaimer, the term of this patent is extended or adjusted under 35 U.S.C. 154(b) by 0 days.

(21) Appl. No.: 09/969,174

(22) Filed: Oct. 1, 2001

(51) Int. Cl.[7] ............................................. A01M 31/06
(52) U.S. Cl. ................................................ 43/3; 43/2
(58) Field of Search ........................... 43/2, 3; 114/300, 114/294; 441/1, 25, 6, 23, 24, 28; 242/405.1, 388, 125.2, 407

(56) References Cited

U.S. PATENT DOCUMENTS

| | | | | |
|---|---|---|---|---|
| 189,601 A | * | 4/1877 | Buck | 114/300 |
| 722,682 A | * | 3/1903 | Dills | 43/3 |
| 1,468,780 A | * | 9/1923 | Fraser | 43/3 |
| 1,705,335 A | * | 3/1929 | Owen | 114/300 |
| 2,023,526 A | * | 12/1935 | Hoberg | 43/3 |
| 2,520,233 A | * | 8/1950 | Buehl | 43/3 |
| 2,555,815 A | * | 3/1951 | Rawlins et al. | 43/3 |
| 2,630,093 A | * | 3/1953 | Toal | 114/294 |
| 2,678,778 A | * | 5/1954 | Gibson | 242/405.1 |
| 3,254,439 A | * | 6/1966 | Hansen | 43/3 |
| 3,402,689 A | * | 9/1968 | James, Jr. et al. | 114/300 |
| 3,798,820 A | * | 3/1974 | Dye | 43/3 |
| 3,888,032 A | * | 6/1975 | Gagnon | 43/3 |
| 3,930,328 A | | 1/1976 | Knuth | |
| 4,656,771 A | | 4/1987 | Holmes | |
| 4,674,219 A | * | 6/1987 | Chargo et al. | 43/3 |
| 4,826,099 A | * | 5/1989 | Johnson | 242/375 |
| 4,976,641 A | * | 12/1990 | D'Amico | 441/23 |
| 5,168,650 A | * | 12/1992 | Martin | 43/3 |
| 5,367,813 A | | 11/1994 | Cherry | |
| 5,461,816 A | * | 10/1995 | Gazalski | 43/3 |
| 5,551,901 A | * | 9/1996 | Jaeger | 441/6 |
| 5,769,677 A | * | 6/1998 | Bell | 441/24 |
| 5,822,907 A | | 10/1998 | Lukey | |
| 5,899,014 A | | 5/1999 | Bornhoft et al. | |
| 5,941,008 A | | 8/1999 | Schmidt et al. | |
| 5,992,078 A | | 11/1999 | Willis | |

* cited by examiner

Primary Examiner—Charles T. Jordan
Assistant Examiner—Joan M. Olszewski
(74) Attorney, Agent, or Firm—Lathrop & Gage, L.C.

(57) ABSTRACT

A waterfowl decoy anchor system and method for using the same. The anchor includes a bail secured to an anchor base, a band secured to the bail through a bore in the anchor base. A tether attaches the anchor to a decoy. The tether is wound about the bail and the bail is positioned over the forward edge of the decoy keel. The band is secured over the rearward edge of the decoy keel.

9 Claims, 2 Drawing Sheets

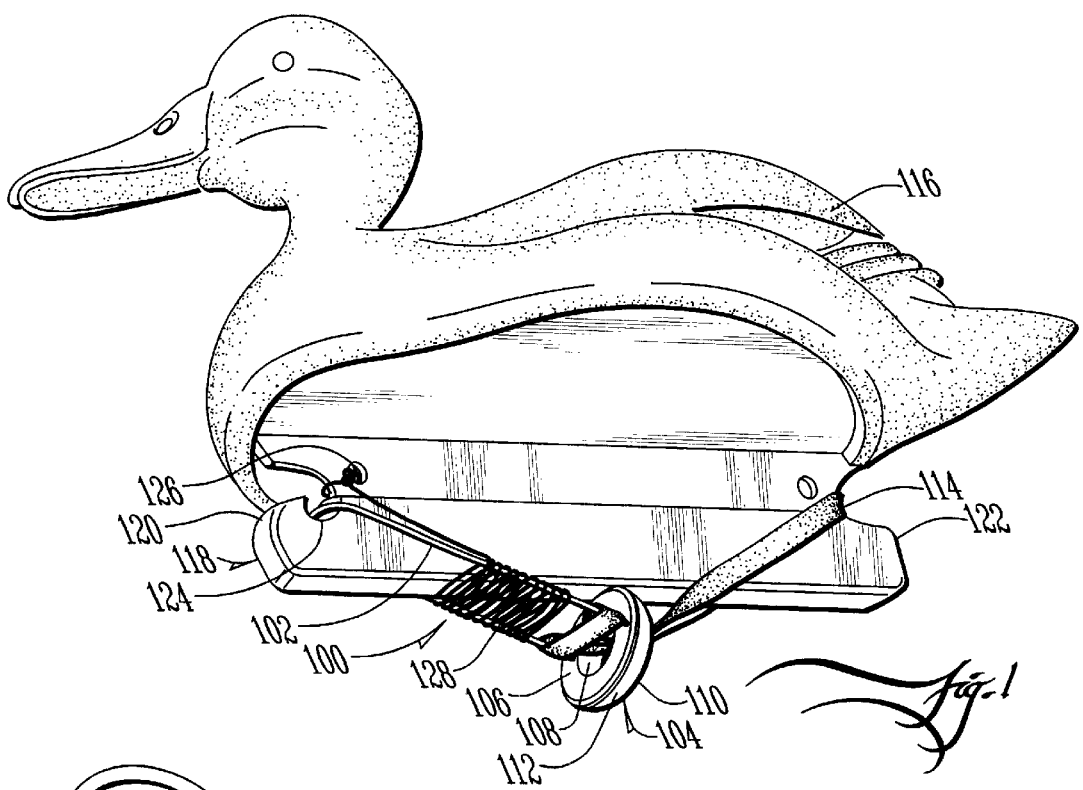
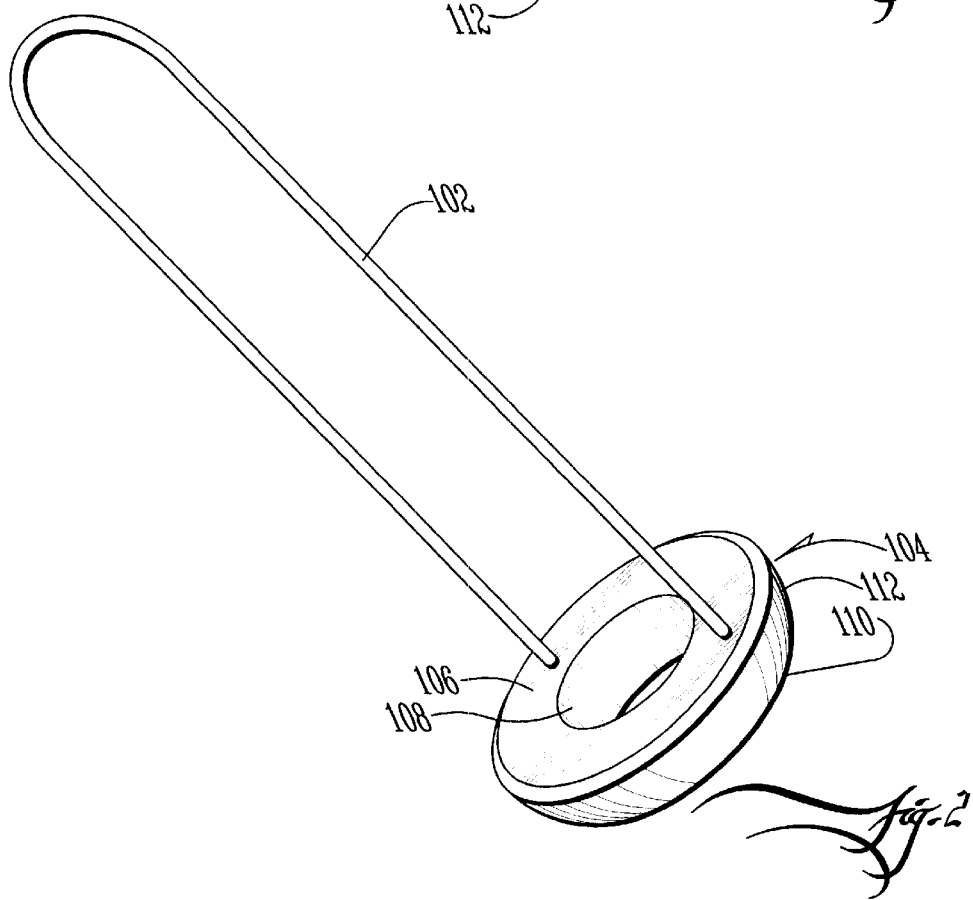

DECOY ANCHOR SYSTEM AND METHOD OF USE

FIELD OF THE INVENTION

The present invention is directed to an anchor and anchor attachment for decoys, such as those commonly used by waterfowl hunters, and the method for using the same.

BACKGROUND OF THE INVENTION

Waterfowl hunting is an old sport which thrives and grows on an annual basis. For over one hundred years, hunters have used decoys to attract flying waterfowl to the hunting site. As decoys have developed, numerous systems and methods for securing floating decoys have evolved. Commonly, decoys are secured to a cord provided with a metal anchor, or other weighted material.

As any waterfowl hunter will relate, annoying and bothersome problems exist with every known decoy anchor system. When decoys are retrieved from water it is common to wind the cord and weight around the decoy body, keel or neck. Typically, the cords will unwind during storage or carting and the weights or anchors will strike against, and damage the decoys. Further, the cords will often become entangled and delay deployment of the decoys upon arrival at the hunting site.

Several anchors have been developed to overcome the limitations and problems described. One such device is a mushroom-shaped anchor which is bendable about the neck of the decoy during storage. However, after repeated bending, the anchor will break. Another device is a plastic water ballast which slides over the decoy neck during storage. The plastic is quickly broken or damaged upon use, particularly from striking submerged rocks, or upon retrieval from a body of water having a rocky bottom. Moreover, the loose fit of the anchor about the decoy quickly degrades the paint or finish of the decoy. Perhaps most importantly, such anchors ineffectively secure the decoy in place during use as they do not obtain purchase at the bottom of the water body.

Thus, what is needed is a waterfowl decoy anchor system which overcomes each of the stated limitations of the known devices.

DISCLOSURE OF THE INVENTION

An apparatus constructed in accordance with the present invention provides a waterfowl anchor system which limits damage to decoys during storage, prevents tangling of the anchor cord, and is easily and quickly deployed into the water.

To attain these advantages the present invention generally comprises a bail secured to an annular anchor base. A band is secured to the bail and passed through a bore in the anchor base. A pliable tether is attached between a waterfowl decoy and the bail opposite the anchor base.

During storage of the decoy, the tether is wound about the bail and the bail is positioned over either end of the decoy keel. The band is securable over the opposite end of the decoy keel. During deployment of the decoy into water, the band and bail are removed from the keel and the decoy and attached anchor are simply thrown into the water. The novel shape of the bail allows the tether to quickly unwind the length of tether necessary for the anchor base to seat on the bottom surface. The unique shape of the anchor base maximizes the amount of purchase, and therefore, holding power.

It is, therefore, desirable to provide a waterfowl decoy anchor system which is easy to use and which secures the anchor onto the decoy during storage to prevent damage to the decoy. It is also desirable that the anchor system retain the anchor cord during storage to prevent tangling. The desired anchor system will also secure the decoy in place during use by obtaining a firm purchase on the bottom surface.

Now, having generally described the present invention, it is understood that additional features of the inventive device will be described hereinafter and the scope of the invention is not limited in its application to the details of construction and to the arrangements of the components set forth in the following description or illustrated in the drawings.

BRIEF DESCRIPTION OF THE DRAWINGS

FIG. 1 is a perspective view of the inventive device as it is stored on a duck decoy.

FIG. 2 is a perspective view of the anchor of the inventive device.

DETAILED DESCRIPTION OF THE PREFERRED EMBODIMENTS

Figure 3:
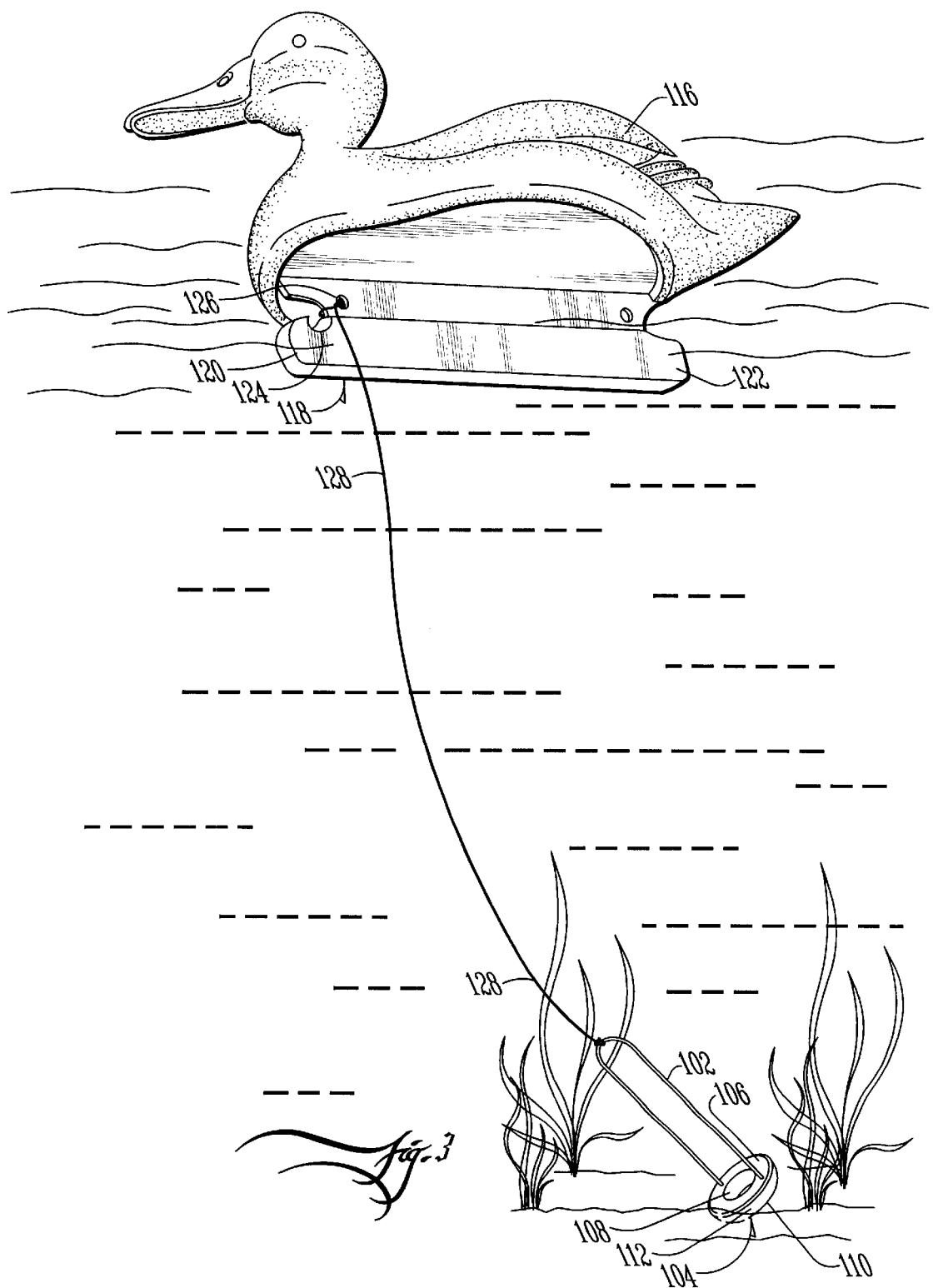
FIG. 3 is a perspective view of the inventive device in deployment.

A waterfowl decoy anchor system 100 of the present invention is generally illustrated at FIGS. 1 and 2. The anchor system generally comprises a bail 102 attached to an anchor base 104. Both the bail 102 and anchor base 104 have novel designs which further the desirability of the inventive device.

The bail 102 is preferrably formed from wire which is bent into a U-shape with both ends fixed to the anchor base 104 such that the bail is oriented generally upward from and substantially perpendicular to an upper surface 106 of the anchor base 104. A bore 108 is formed through the anchor base 104 between the upper surface 106 and a lower surface 110. The bail 102 is positioned with its apex substantially over and aligned with the bore 108.

It is preferred that the anchor base 104 is molded lead for ease of construction. However, virtually any weighted material, which does not degrade in water, could be used. The upper surface 106 of the anchor base 104 is slightly larger than the lower surface 110 such that a tapered edge 112 is formed. A stretchable band 114 is passed through the anchor base 104 bore 108 and secured about the bail 102 substantially adjacent the upper surface 106. It is preferred that the stretchable band 114 is formed from elastic, however, a variety of stretchable materials could be used.

As shown in FIG. 1, a waterfowl decoy 116 is generally provided with a keel 118. The keel 118 has a first or forward edge 120 and a second or rearward edge 122. It should be understood that for the purpose of this description that the forward and rearward edges of the decoy keel are specified for attachment of specific portions of the anchor 100, however, the anchor can be attached and oriented in any direction along the decoy keel 118.

Many decoys are formed with a hooking notch 124 at one or both ends of the keel 118. It is preferred that a tether hole 126 is provided near the keel 118. The tether hole 126 may be at different positions within the keel 118 to encourage different movement and positioning of the decoy 116 on the water.

A tether 128 is attached between the tether hole 126 of the decoy 116 and the bail 102 of the anchor system 100. Various material are appropriate for use as the tether 128 such as rope, twine, wire, elastic or small gauge chain.

However, it is preferred that the tether 128 is constructed of natural or synthetic twine which is flaccid and knot resistant.

In FIG. 1, the anchor system 100 is shown attached to the decoy 116 for storage. The tether 128 is wound about the bail 102 substantially adjacent the anchor base 104. The bail 102 is hooked over the forward edge 120 of the keel 118 and the elastic band 114 is stretched and secured over the rearward edge 122 of the keel 118. Tension provided by the elastic band 114 prevents the anchor system 100 from coming loose from the keel 118 during transport and limits undesirable movement of the anchor system 100 during storage which decreases damage to the decoys.

The tapered U-shaped design of the bail 102 prevents the tether 128 from sliding upward away from the anchor base 104. Further, the keel 118 will typically precluded the tether 128 from sliding upward over the bail 102. By tightly winding the tether 128 about the bail 102, the tether 128 can not slide downward over the anchor base 104.

To deploy the decoy 116 into water, the elastic band 114 is taken off the rearward edge 122 of the keel 118 and the bail 102 is removed from the forward edge 120 of the keel 118. The decoy 116 and anchor system 100 are then thrown into the water. Upon contacting the water, the anchor system 100 will sink and the buoyant decoy 116 will float. As anchor system 100 sinks, the tether will unwind from the bail 102 until the anchor base 104 strikes the bottom surface of the water body. As wind and waves move the decoy 116 the entire tether 128 will likely unwind from the bail 102.

As shown in FIG. 3, when the decoy 116 moves about on the surface of the water it will pull on the anchor system 100 in the direction of movement. The orientation of the bail 102 to the anchor base 104, as well as the positioning of the tether 128 on the bail 102 will cause the tapered edge 112 of the anchor base 104 to obtain purchase in the bottom surface. The tapered edge 112 discourages the anchor base 104 from sitting flat on the lower surface 110 and directional movement of the decoy 116 forces the tapered edge 112 of the anchor base 104 into the bottom surface of the water body. This increases the desired purchase of the anchor system on the bottom surface. The tapered edge 112 may be formed by rounding the lower surface 110.

It is understood that the anchor system 100 can be made in any size, dimension or weight. Generally, it is preferred that the bail 102 is between one-half (½) to three-fourths (¾) the length of the keel 118. The weight of the anchor system 100 is generally determined by the size of the anchor base 104. Obviously, heavier anchors are needed for larger decoys such as goose decoys. It is preferred that the anchor base 104 weigh between 4 and 16 ounces (113 and 454 grams).

It is preferred that the anchor base 104 is coated with plastic, rubber or other material, which has the dual function of limiting lead to human and lead to water contact as well as decreasing decoy damage during storage and transportation.

Having specifically described illustrative embodiments of the invention with reference to the accompanying drawings, it is to be understood that the invention is not limited to those precise embodiments and that various changes and modifications may be effected therein by one skilled in the art without departing from the scope and spirit of the invention as defined in the appended claims.

What is claimed is:

1. A waterfowl decoy anchor system comprising:
   an anchor base having an upper surface, a lower surface and a bore therebetween;
   a bail connected to the upper surface of the anchor base;
   a stretchable band secured about the bail and through the bore of the anchor base; and
   a tether secured between the bail and a waterfowl decoy.

2. The waterfowl decoy anchor system of claim 1, wherein the bail is substantially U-shaped.

3. The waterfowl decoy anchor system of claim 2, wherein the bail tapers toward the upper surface of the anchor base.

4. The waterfowl decoy anchor system of claim 3, wherein the bail is made of wire.

5. The waterfowl decoy anchor system of claim 1, wherein the anchor base has a tapered edge between the upper surface and the lower surface.

6. The waterfowl decoy anchor system of claim 1, wherein the anchor base is substantially annular and formed from lead.

7. The waterfowl decoy anchor system of claim 1, wherein the bail is preferably between one-half and three-quarters the length of a waterfowl decoy keel.

8. The waterfowl decoy anchor system of claim 1, wherein the anchor base weighs between approximately four and approximately sixteen ounces.

9. The waterfowl decoy anchor system of claim 1, wherein the lower surface of the anchor base is substantially rounded.

\* \* \* \* \*